(12) United States Patent
Ekpenyong et al.

(10) Patent No.: US 11,576,035 B2
(45) Date of Patent: *Feb. 7, 2023

(54) UPLINK SIGNALING FOR COOPERATIVE MULTIPOINT COMMUNICATION (71) Applicant: Texas Instruments Incorporated, Dallas, TX (US)

(72) Inventors: Anthony Ekpenyong, Farmers Branch, TX (US); Ralf Bendlin, Plano, TX (US); Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,231

(22) Filed: Sep. 30, 2019

(65) Prior Publication Data
US 2020/0029203 A1 Jan. 23, 2020

Related U.S. Application Data (63) Continuation of application No. 13/952,588, filed on Jul. 27, 2013, now Pat. No. 10,433,159.

(Continued)

(51) Int. Cl.
H04L 12/26 (2006.01)
H04W 8/24 (2009.01)
(Continued)

(52) U.S. Cl.
CPC ............ H04W 8/245 (2013.01); H04B 7/024 (2013.01); H04L 5/0035 (2013.01); H04W 28/18 (2013.01);
(Continued)

(58) Field of Classification Search
USPC ........ 370/229, 230, 235, 236, 252, 328, 329
See application file for complete search history.

(56) References Cited

U.S. PATENT DOCUMENTS

| 10,433,159 B2 * | 10/2019 | Ekpenyong ............ H04B 7/024 |
| 2008/0233966 A1 | 9/2008 | Scheim et al. |
| 2009/0046645 A1 * | 2/2009 | Bertrand .............. H04J 11/0069 370/329 |
| 2009/0147865 A1 | 6/2009 | Zhang |

(Continued)

FOREIGN PATENT DOCUMENTS

| CN | 102026298 A | 4/2011 |
| WO | 2011046353 A2 | 4/2011 |

(Continued)

OTHER PUBLICATIONS

"Transmission of Uplink Control Signalling," InterDigital Communications, LLC., 3GPP TSG-RAN WG1 Meeting 68bis, R1-121316, Jeju, Korea, Mar. 26-30, 2012, 3 pages.

(Continued)

Primary Examiner — Nguyen H Ngo
(74) Attorney, Agent, or Firm — Gregory J. Albin; Frank D. Cimino (57) ABSTRACT A method of operating a wireless communication system is disclosed (FIG. 6). The method includes receiving a virtual cell identification (VCID) parameter (600) from a remote transmitter. A base sequence index (BSI) and a cyclic shift hopping (CSH) parameter (604,606) are determined in response to the VCID. A pseudo-random sequence is selected in response to the BSI and CSH (610,612). A reference signal is generated using the selected pseudo-random sequence (614).

22 Claims, 7 Drawing Sheets

Related U.S. Application Data (60) Provisional application No. 61/679,400, filed on Aug. 3, 2012, provisional application No. 61/846,880, filed on Jul. 16, 2013.

(51) Int. Cl.

| | |
|---|---|
| *H04B 7/024* | (2017.01) |
| *H04L 5/00* | (2006.01) |
| *H04W 28/18* | (2009.01) |
| *H04W 52/02* | (2009.01) |
| *H04W 52/32* | (2009.01) |
| *H04L 1/16* | (2006.01) |
| *H04W 52/14* | (2009.01) |
| *H04W 52/40* | (2009.01) |

(52) U.S. Cl.
CPC ..... *H04W 52/0229* (2013.01); *H04W 52/325* (2013.01); *H04L 1/1671* (2013.01); *H04L 5/0051* (2013.01); *H04L 5/0055* (2013.01); *H04W 52/146* (2013.01); *H04W 52/40* (2013.01); *Y02D 30/70* (2020.08)

(56) References Cited

U.S. PATENT DOCUMENTS

| | | | |
|---|---|---|---|
| 2009/0232067 | A1 | 9/2009 | Pajukoski et al. |
| 2011/0110398 | A1* | 5/2011 | Zhang ................ H04L 5/0051 370/252 |
| 2011/0171964 | A1 | 7/2011 | Lin et al. |
| 2011/0243017 | A1 | 10/2011 | Prasad et al. |
| 2011/0312316 | A1 | 12/2011 | Baldemair et al. |
| 2012/0044906 | A1 | 2/2012 | Chen et al. |
| 2012/0113831 | A1 | 5/2012 | Pelletier et al. |
| 2013/0034066 | A1 | 2/2013 | Kakishima et al. |
| 2013/0039231 | A1 | 2/2013 | Wang |
| 2013/0195025 | A1* | 8/2013 | Chatterjee ............ H04B 7/0623 370/329 |
| 2013/0242890 | A1 | 9/2013 | He et al. |
| 2013/0294400 | A1 | 11/2013 | Liu |
| 2013/0343300 | A1 | 12/2013 | Kim et al. |
| 2014/0177601 | A1 | 6/2014 | Nishio et al. |
| 2014/0301329 | A1 | 10/2014 | Kim et al. |
| 2015/0003407 | A1 | 1/2015 | Seo et al. |

FOREIGN PATENT DOCUMENTS

| | | |
|---|---|---|
| WO | 2011105845 A2 | 9/2011 |
| WO | 2012096484 A2 | 7/2012 |

OTHER PUBLICATIONS

"SRS for UL CoMP," Interdigital Communications, LLC., 3GPP TSG-RAN WG1 Meeting #68bis, R1-121747, Jeju Korea, Mar. 26-30, 2012, 1 page.
"Further Discussions on PUCCH Transmissions for UL CoMP," Samsung, 3GPP TSG RAN WG1 Meeting #68bis, R1-121869, Jeju, Korea, Mar. 26-30, 2012, 3 pages.
"Consideration for PUCCH Enhancement," ZTE, 3GPP TSG-RAN WG1 Meeting #69, R1-122146, Prague, Czech Republic, May 21-25, 2012, 3 pages.
"PUCCH Enhancement for UL CoMP," Panasonic, 3GPP TSG-RAN WG1 Meeting #69, R1-122197, Prague, Czech Republic, May 21-25, 2012, 4 pages.
"PUCCH Configuration for UL CoMP," Sharp, 3GPP TSG RAN WG1 Meeting #69, R1-122385, Prague, Czech Republic, May 21-25, 2012, 4 pages.
"Enhancement for PUCCH in Rel-11," Pantech, 3GPP TSG RAN WG1 Meeting #69, R1-122454, Prague, Czech Republic, May 21-25, 2012, 3 pages.
"PUCCH Enhancements for UL CoMP," InterDigital Communication, LLC., 3GPP TSG-RAN WG1 Meeting #69, R1-122554, Prague, Czech Republic, May 21-25, 2012, 3 pages.
"Further Consideration on Uplink Control for CoMP," Texas Instruments, 3GPP TSG RAN WG1 #69, R1-122947, Prague, Czech Republic, May 21-25, 2012, 3 pages.
"Way Forward on UE-Specific Configurations for SRS," KDDI, et al., 3GPP TSG RAN WG1 Meeting #69, R1-122981, Prague, Czech Republic, May 21-25, 2012, 8 pages.
"Way Forward on PUCCH Sequence and Resource," Panasonic, et al., 3GPP TSG RAN WG1 #69, R1-122983, Agenda Item 7.5.6.3, Prague, Czech Republic, May 2012, 5 pages.
"3rd Generation Partnership Project; Technical Specification Group Radio Access Network; Evolved Universal Terrestrial Radio Access (E-UTRA); LTE Physical Layer; General Description (Release 9)," 3GPP TS 36.201, V9.1.0, Mar. 2010, 13 pages.
"3rd Generation Partnership Project; Technical Specification Group Radio Access Network; Evolved Universal Terrestrial Radio Access (E-UTRA); Physical Channels and Modulation (Release 9)," 3GPP TS 36.211, V9.1.0, Mar. 2010, 87 pages.
"3rd Generation Partnership Project; Technical Specification Group Radio Access Network; Evolved Universal Terrestrial Radio Access (E-UTRA); Multiplexing and Channel Coding (Release 9)," 3GPP TS 36.212, V9.2.0, Jun. 2010, 5 pages.
"3rd Generation Partnership Project; Technical Specification Group Radio Access Network; Evolved Universal Terrestrial Radio Access (E-UTRA); Physical Layer Procedures(Release 9)," 3GPP TS 36.213, V9.2.0, Jun. 2010, 81 pages.
International Search Report and Written Opinion dated Nov. 20, 2013, PCT Application No. PCT/US2013/053424, 11 pages.
Third Office Action dated Jun. 8, 2018, Chinese Application No. 201380041227.4, 17 pages.
"CoMP RRC Parameters," 3GPP TSG RAN WG1 #69, R1-122243, Samsung, Prague, Czech Republic, May 21-25, 2012, 5 pages.
Chinese First Office Action dated Mar. 24, 2022, Chinese Application No. 201910608365.5, 17 pages.
Parkvall, Stefan, Email with attachment to 3GPP RAN1 working group (3GPP_TSG_RAN_WG1) dated Jun. 21, 2012, Subject: Draft CR to 36.211—inclusion of Rel-11 features, available at: https://list.etsi.org/scripts/wa.exe? A2=3GPP_TSG_RAN_WG1,f81c3b43.1206C&S=, Jun. 21, 2012 (100 pages).
"PUCCH Enhancement for UL Comp," 3GPP TSG-RAN WG1 Meeting #68bis, R1-121158, Panasonic, Jeju, Korea, Mar. 26-30, 2012 (4 pages).

* cited by examiner

FIG. 1

(PRIOR ART)

FIG. 2

(PRIOR ART)

UPLINK SIGNALING FOR COOPERATIVE MULTIPOINT COMMUNICATION

This application is a continuation of U.S. patent application Ser. No. 13/952,588, filed Jul. 27, 2013, which claims the benefit under 35 U.S.C. § 119(e) of U.S. Provisional Appl. No. 61/679,400, filed Aug. 3, 2012 and U.S. Provisional Appl. No. 61/846,880, filed Jul. 16, 2013, all of which are incorporated herein by reference in their entirety.

BACKGROUND OF THE INVENTION

The present embodiments relate to wireless communication systems and, more particularly, to uplink signaling of control information in a cooperative multipoint (CoMP) communication system.

Conventional cellular communication systems operate in a point-to-point single-cell transmission fashion where a user terminal or equipment (UE) is uniquely connected to and served by a single cellular base station (eNB or eNodeB) at a given time. An example of such a system is the 3GPP Long-Term Evolution (LTE Release-8). Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system (Release-10 and beyond). This greatly improves received signal strength at the UE by transmitting the same signal to each UE from different base stations. This is particularly beneficial for cell edge UEs that observe strong interference from neighboring base stations. With CoMP, the interference from adjacent base stations becomes useful signals and, therefore, significantly improves reception quality. Hence, UEs in CoMP communication mode will get much better service if several nearby cells work in cooperation.

Figure 1:
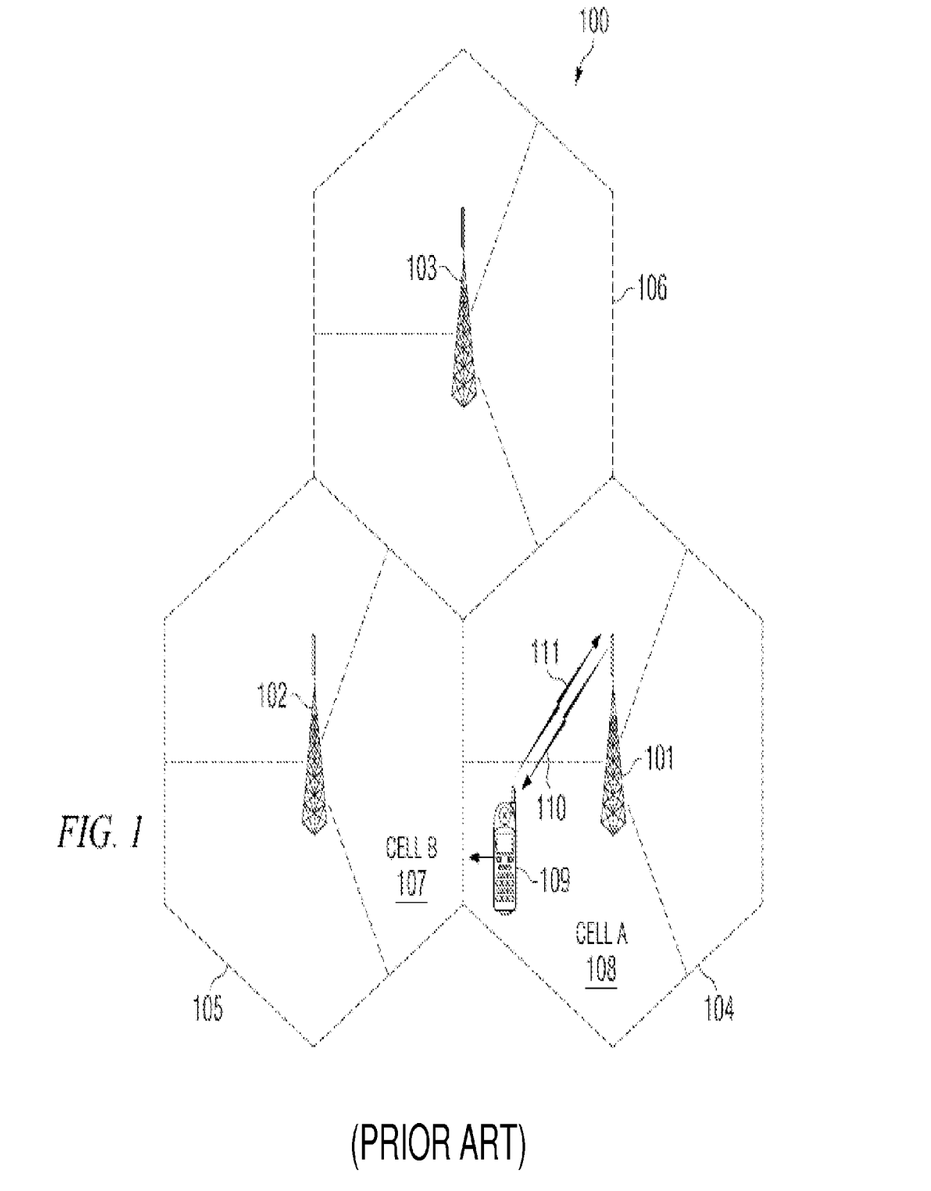
FIG. 1 is a diagram of a wireless communication system of the prior art.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 (eNB) is operable over corresponding coverage areas 104, 105, and 106. Each base station's coverage area is further divided into cells. In the illustrated network, each base station's coverage area is divided into three cells. A handset or other user equipment (UE) 109 is shown in cell A 108. Cell A 108 is within coverage area 104 of base station 101. Base station 101 transmits to and receives transmissions from UE 109. As UE 109 moves out of Cell A 108 into Cell B 107, UE 109 may be handed over to base station 102. Because UE 109 is synchronized with base station 101, UE 109 can employ non-synchronized random access to initiate a handover to base station 102. UE 109 can also employ non-synchronized random access to request allocation of uplink 111 time or frequency or code resources. If UE 109 has data ready for transmission, which may be traffic data, a measurements report, or a tracking area update, UE 109 can transmit a random access signal on uplink 111. The random access signal notifies base station 101 that UE 109 requires uplink resources to transmit the UE's data. Base station 101 responds by transmitting to UE 109 via downlink 110 a message containing the parameters of the resources allocated for the UE 109 uplink transmission along with possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval. Base station 101 configures UE 109 for periodic uplink sounding reference signal (SRS) transmission. Base station 101 estimates uplink channel quality information (CQI) from the SRS transmission.

Uplink (UL) cooperative multipoint (CoMP) communication requires coordination between multiple network nodes to facilitate improved reception from a UE. This involves efficient resource utilization and avoidance of high inter-cell interference. In particular, heterogeneous deployments of small cells that are controlled by low power nodes such as pico eNBs and remote radio heads (RRHs) are deployed within a macro cell such as 108. In a coordinated multi-point (CoMP) wireless communication system, a UE receives signals from multiple base stations (eNB). These base stations may be macro eNB, pico eNB, femto eNB, or other suitable transmission points (TP). For each UE, a plurality of channel state information reference signal (CSI-RS) resources is configured based on which the UE can measure the downlink channel state information. Each CSI-RS resource can be associated by the E-UTRAN with a base station, a remote radio head (RRH), or a distributed antenna. The UE subsequently transmits to an eNB by an OFDM frame using allocated physical resource blocks (PRBs) in the uplink (UL).

Figure 2:
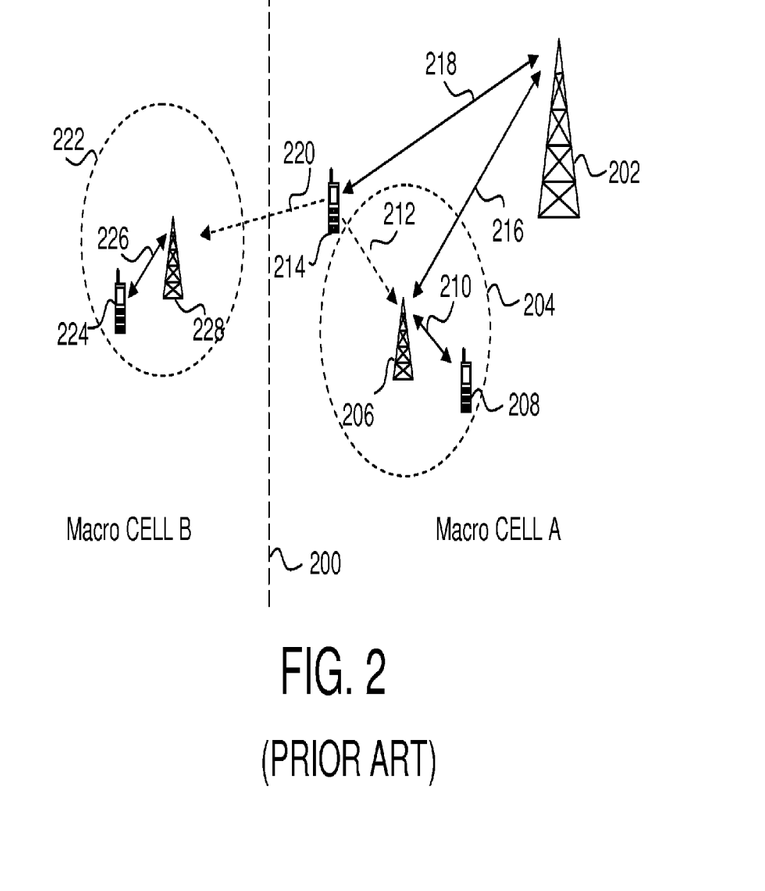
FIG. 2 is a diagram of a heterogeneous deployment of a wireless communication system of the prior art showing a macro cell and two pico cells.

Referring now to FIG. 2, there is a diagram of a heterogeneous wireless communication system of the prior art. The system includes macro cells A and B separated by cell boundary 200. Cell A is controlled by macro eNB 202 and includes a pico cell 204 that is controlled by pico eNB 206. Cell B includes a pico cell 222 that is controlled by pico eNB 228 in communication 226 with pico UE 224. Pico eNB 206 serves UEs such as pico UE 208 within region 204. Pico eNB 206 communicates with pico UE 208 over data and control channels 210. Cell A also includes macro UE 214 which communicates directly with macro eNB 202 over data and control channels 218. The introduction of pico eNB 206 within macro cell A offers cell or area splitting gain due to the creation of additional cells within the same geographical area. Heterogeneous deployments can be further classified as either shared or unique physical cell identity (PCID) scenarios. Referring to FIG. 2, in the shared PCID scenario, both macro eNB 202 and pico eNB 206 share the same PCID. Therefore, DL transmission from both base stations to a UE can be made to appear a single transmission from a distributed antenna system. Alternatively, pico eNB 206 may have a different unique PCID from macro eNB 202. These two scenarios result in different interference environments.

Uplink reference signals from a UE to an eNB are used to estimate the uplink channel state information. These reference signals include control channel reference signals (RS), traffic channel demodulation reference signals (DMRS), and sounding reference signals (SRS). In LTE the control and traffic channels are known as the Physical Uplink Control Channel (PUCCH) and Physical Uplink Shared Channel (PUSCH), respectively. Orthogonality of a reference signal within a cell is maintained by using different cyclic shifts from a base sequence. Uplink reference signals within the communication system are typically modulated with a constant amplitude zero autocorrelation (CAZAC) sequence or pseudorandom noise (PN) sequence. Different base sequences, however, are not orthogonal and require good network planning to achieve low cross correlation between adjacent cells. Inter-cell interference is mitigated by interference randomization techniques such as cell-specific base sequence hopping and cyclic shift hopping patterns. More-over, different problems arise depending on whether all cells within a CoMP communication system have a unique cell ID or share the same cell ID.

In a heterogeneous wireless communication system of prior art, inter-cell interference is significantly increased because of short inter-site or inter-point distances. For UL cell selection it is better, in terms of reducing UL interference, for the UE to select the cell with the lowest path loss. For example, macro UE 214 transmits uplink data and control and also receives downlink control information on wireless connection 218 with macro eNB 202. However, the communication link 212 between macro UE 214 and pico eNB 206 has a shorter path loss compared to communication link 218. Thus, macro UE 214 generates significant UL interference 212 to pico eNB 206 while trying to maintain acceptable link quality with macro eNB 202. When macro UE 214 is near a cell boundary 200, it may also generate significant interference 220 for pico eNB 228. For the shared PCID scenario, all eNBs within the macro cell effectively form a super-cell comprising a distributed antenna system by virtue of the single PCID. Therefore, there is little to no intra-cell interference since transmitted reference signals are cyclic shifts of the same base sequence. On the other hand, area splitting gain cannot be obtained to take advantage of multiple deployed eNBs in the same geographical area. For the unique PCID scenario, macro UE 214 may generate unacceptable UL interference to pico eNB 206. Conversely, pico eNB 206 degrades the DL reception of macro UE 214. Therefore, it is desirable for macro UE 214 to be configured to transmit to pico eNB 206 to reduce interference and also conserve battery life by lowering its UL transmit power. Therefore, it can be observed that there is a tradeoff between increasing network capacity and mitigating the resulting increase in inter-cell or inter-point interference.

While the preceding approaches provide steady improvements in wireless communications, the present inventors recognize that still further improvements in transmission of UL control information are possible. Accordingly, the preferred embodiments described below are directed toward this as well as improving upon the prior art.

BRIEF SUMMARY OF THE INVENTION

In a preferred embodiment of the present invention, there is disclosed a method of operating a wireless communication system. The method includes receiving an identification parameter (ID) from a remote transmitter. A base sequence index (BSI) and a cyclic shift hopping (CSH) sequence are determined in response to the received ID. A first pseudo-random sequence is determined in response to the BSI. A subsequent pseudo-random sequence is selected in response to the CSH. The method also includes receiving a set of dedicated parameters from a remote transmitter to determine the time/frequency region to transmit uplink control information or a sounding reference signal.

DETAILED DESCRIPTION OF THE INVENTION

Inter-channel interference is a significant problem in the uplink control channel of an LTE wireless communication system.

Figure 3:
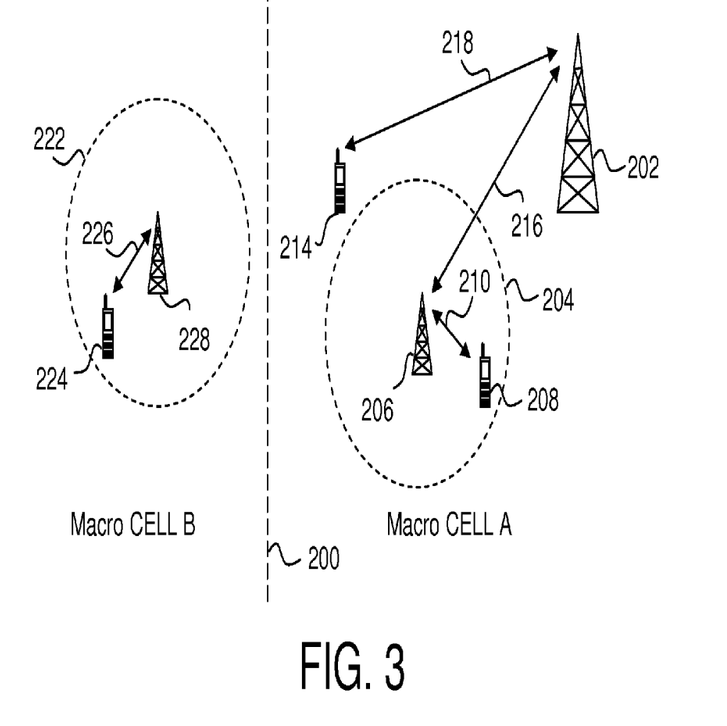
FIG. 3 is a diagram of a wireless communication system of the present invention showing a macro cell and a pico cell deployed within the macro cell area with reduced inter-point interference.

The following abbreviations may be used throughout the instant specification.
BLER: Block Error Rate
BSI: Base Sequence Index
CQI: Channel Quality Indicator
CRS: Cell-specific Reference Signal
CRC: Cyclic Redundancy Check
CSH: Cyclic Shift Hopping
CSI: Channel State Information
CSI-RS: Channel State Information Reference Signal
DCI: Downlink Control Indicator
DL: DownLink
DMRS: Demodulation Reference Symbol or UE-specific Reference Symbol
DPS: Dynamic Point Selection
eNB: E-UTRAN Node B or base station
EPDCCH: Enhanced Physical Downlink Control Channel
E-UTRAN: Evolved Universal Terrestrial Radio Access Network
HARQ-ACK: Hybrid Auto Repeat Request-Acknowledge
IRC: Interference Rejection Combining
JT: Joint Transmission
LTE: Long Term Evolution
MIMO: Multiple-Input Multiple-Output
MRC: Maximum Ratio Combining
PCFICH: Physical Control Format Indicator Channel
PCID: Physical Cell Identification PDCCH: Physical Downlink Control Channel
PDSCH: Physical Downlink Shared Channel
PMI: Precoding Matrix Indicator
PRB: Physical Resource Block
PUCCH: Physical Uplink Control Channel
PUSCH: Physical Uplink Shared Channel
QAM: Quadrature Amplitude Modulation
RI: Rank Indicator
RNTI: Radio Network Temporary Indicator
RRC: Radio Resource Control
SNR: Signal to Noise Ratio
SRS: Sounding Reference Signal
TPC: Transmit Power Control
UE: User equipment
UL: UpLink
UpPTS: Uplink Pilot Time Slot
VCID: Virtual Cell Identifier Embodiments of the present invention are directed to enhancing uplink control transmission on the PUCCH and sounding reference signal transmission in a CoMP communication system. The present invention describes methods for partitioning uplink control regions between cells such that inter-cell interference is minimized. A UE close to a cell boundary may generate severe UL interference in an adjacent cell due to transmission of non-orthogonal PUCCH reference signal base sequences in the adjacent cells. The severity of the interference is proportional to the difference in path loss between the UE to intended eNB and the UE to adjacent eNB. Here, path loss is a reduction in power density or signal attenuation with electromagnetic wave propagation. Referring to FIG. 3, according to one embodiment of the present invention for the case where each cell has a unique physical cell ID, pico eNB 206 measures received interference partly due to macro UE 214. If the UL interference is greater than a predetermined threshold, pico eNB 206 informs macro eNB 202 on a backhaul link 216. One logical interface over which such inter-eNB signaling takes place is an X2 interface. Subsequently macro eNB 202 directs macro UE 214 to adopt the PCID of pico cell 206 when initializing the pseudo-random sequence generators for generating the BSI and CSH sequences for PUCCH transmission. The macro UE 214 is now considered a CoMP UE, wherein intra-cell orthogonality between UE 214 and pico UE 208 is achieved and interference 212 (FIG. 2) is eliminated. One problem with this method, however, is that UE 214 determines its resource block allocation for uplink control transmission based on its serving cell's (macro eNB 202) PUCCH parameters. This may result in PUCCH resource allocation collisions between CoMP UEs and legacy UEs when transmitting channel state information reports, scheduling requests, and HARQ-ACK feedback. One solution to this problem is to partition uplink control transmissions from CoMP UEs and legacy UEs into different RBs. This partitioning must be carefully managed to avoid increasing PUCCH overhead.

In an alternative embodiment of the present invention where all cells in a CoMP coordination set share a common PCID, PUCCH area splitting gain is achieved by configuring UEs to transmit to the closest eNBs. Here, there is a trade off between increasing inter-point interference and area PUCCH capacity. According to this embodiment, clusters of UEs that are relatively close to each other and spatially isolated from other clusters are assigned a unique ID for initializing a pseudo-random sequence generator for the PUCCH reference signals and sounding reference signals. The new sets created by these UE clusters can be regarded as virtual cells and the dedicated ID is a corresponding virtual cell ID (VCID).

Other exemplary usages of this concept of a virtual cell are possible. Referring to FIG. 3 an alternative embodiment is as follows. eNB 202 configures macro cell A with PCID=123, pico eNB 206 configures its pico cell with PCID=231 and pico eNB 228 configures its pico cell with PCID=55. A completely new virtual cell under the control of eNB 202 can be created by configuring UE 214 with VCID $n_{ID}$=500.

Dynamic PUCCH resource allocation is considerably different from semi-static PUCCH resource allocation. Here, dynamic PUCCH resource allocation is determined from DL scheduling assignments sent on the PDCCH or EPDCCH. The present invention utilizes existing parameters from LTE Release 8-10 to calculate a single parameter m to map PUCCH resource blocks (RBs) for both legacy and CoMP UEs. The concept taught by the present invention is a method of configuring UE-specific semi-static and dynamic PUCCH regions, where the former determines the semi-static region for transmitting CSI reports, scheduling requests, and HARQ-ACK feedback due to semi-persistent scheduling, whereas the latter determines the region for dynamic HARQ-ACK feedback.

Figure 4:
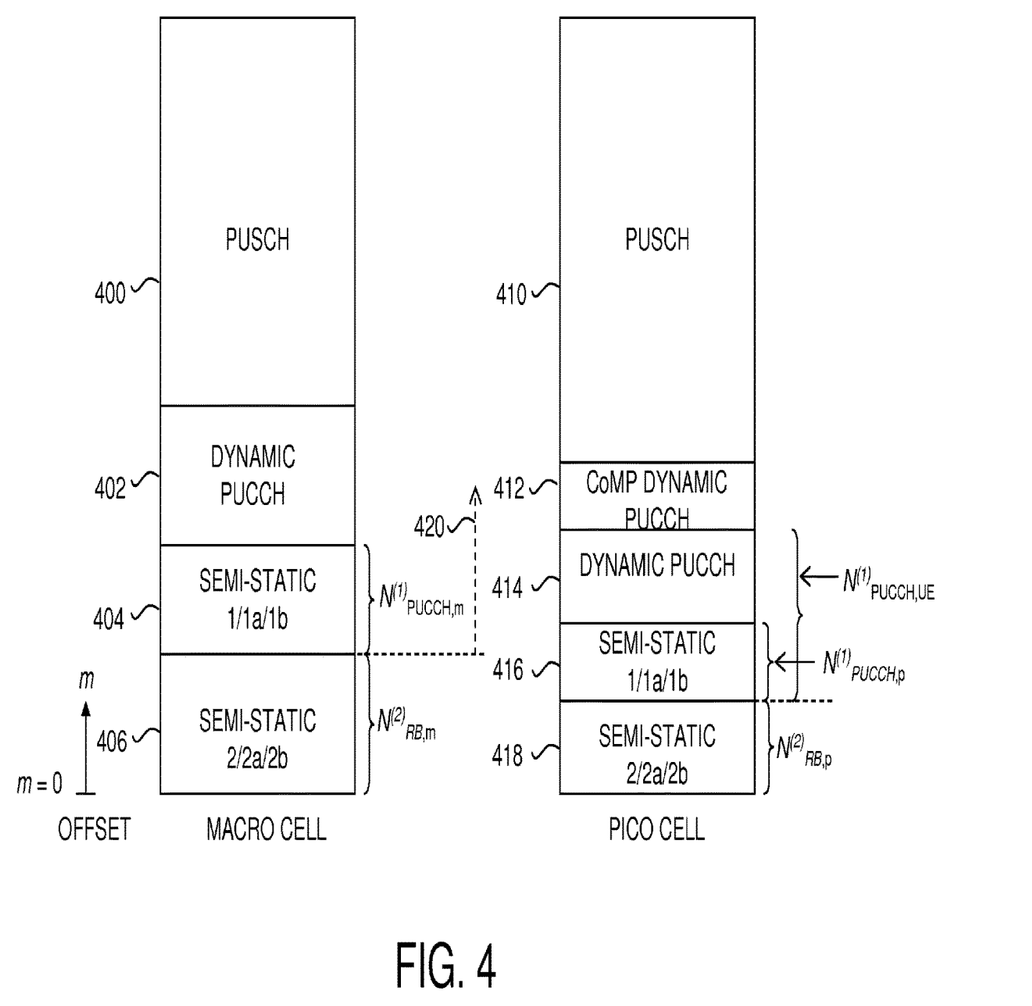
FIG. 4 is a block diagram illustrating logical resource block allocation for a macro cell and a pico cell as in FIG. 3.

Referring now to FIG. 4, there is a diagram showing logical resource block allocation m for a macro cell and a pico cell as in FIG. 3. The parameter m is increasing in the vertical direction as indicated. FIG. 4 illustrates the case of resource block (RB) allocation where a macro UE is virtually transferred to a pico eNB. By virtual transfer we mean that the macro UE is configured as a CoMP UE to transmit uplink control information to the pico eNB. The logical RB map for the macro UE configuration is shown on the left of FIG. 4. Each RB contains a group of PUCCH resources, where the number of resources in a RB depends on the type of PUCCH transmission. Blocks 400 through 406 represent the PUSCH, dynamic PUCCH format 1a/1b, semi-static PUCCH region for PUCCH formats 1/1a/1b, and semi-static PUCCH region for PUCCH formats 2/2a/2b, respectively. The number of RBs allocated to PUCCH formats 2/2a/2b region is denoted by $N^{(2)}_{RB,m}$ while the starting offset for the dynamic PUCCH region is denoted by $N^{(1)}_{PUCCH,m}$. The logical RB map for the pico UE configuration is shown on the right with similar definitions for the semi-static and dynamic PUCCH regions. Block 410 represents PUSCH, block 414 the dynamic PUCCH format 1a/1b region, block 416 the semi-static PUCCH format 1/1a/1b region and block 418 the semi-static PUCCH format 2/2a/2b region. LTE Release 8-10 defines the PUCCH resource mapping to resource block m. A UE of these earlier releases determines the starting offset of the dynamic PUCCH region based on the parameters $N^{(2)}_{RB}$ and $N^{(1)}_{PUCCH}$.

A CoMP UE in a macro cell can be configured to transmit UL control information in a CoMP dynamic PUCCH region depicted by block 412 of FIG. 4. As such, the CoMP uplink control transmission to the pico eNB does not collide with the pico cell's native uplink control transmissions. However, if the CoMP UE is only provided with a new dedicated dynamic PUCCH offset parameter, denoted as $N^{(1)}_{PUCCH,UE}$, it shall use the macro's CSI region parameter $N^{(2)}_{RB,m}$ as an initial offset as illustrated by the vertical arrow 420. In this case, the CoMP UE's dynamic PUCCH transmission may collide with other dynamic PUCCH resources or even PUSCH transmission in the pico cell. Collisions are also likely if a mixed RB exists, wherein one RB contains PUCCH resources for both HARQ-ACK feedback and CSI reports. Therefore, according to embodiments of the present invention both dynamic PUCCH offset and CSI region parameters are provided to the UE.

Figure 5:
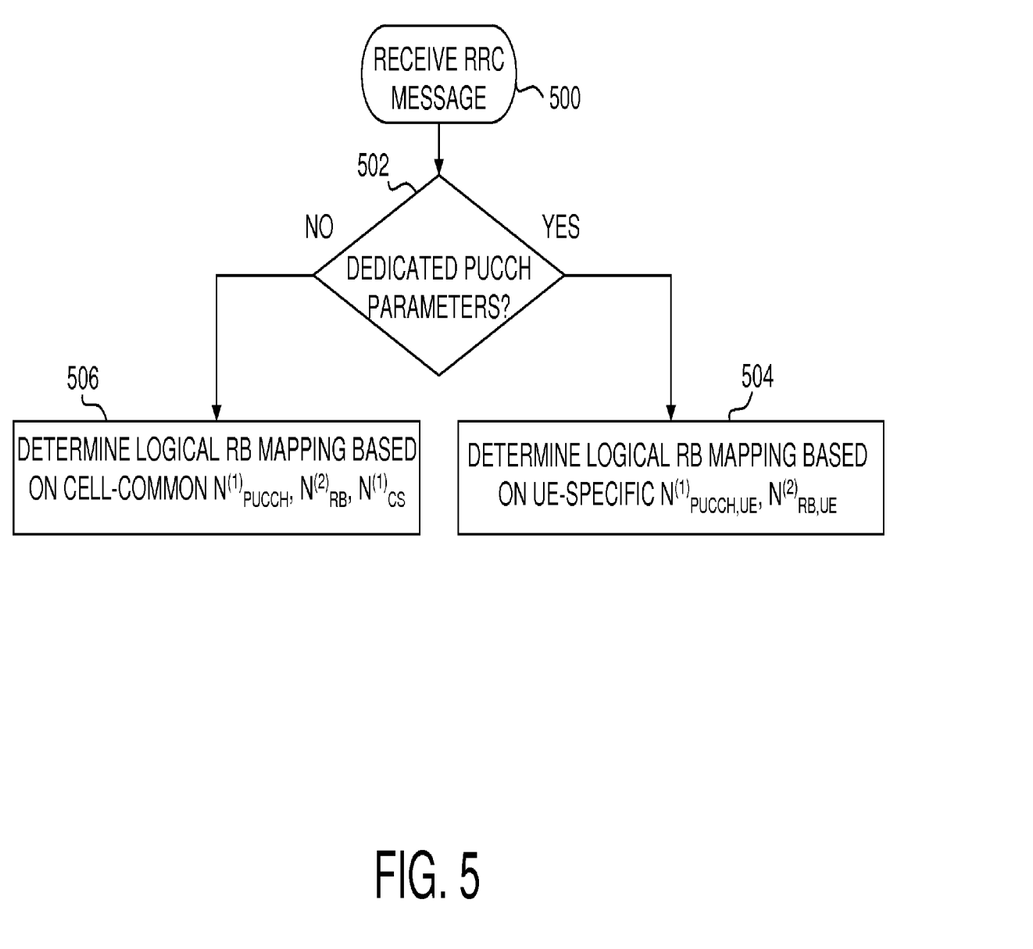
FIG. 5 is a flow diagram showing sequence selection for sounding reference signals (SRS) and PUCCH reference signals (RS)

Referring now to FIG. 5 a flow diagram is shown to illustrate how a UE determines the mapping of a PUCCH resource to a logical resource block. The UE receives an RRC message 500. If one or more dedicated PUCCH parameters from $N^{(1)}_{PUCCH,UE}$ and $N^{(2)}_{RB,UE}$ are detected in message 500, the UE determines the PUCCH resource-to-RB mapping based on the detected parameters 504. Otherwise, if RRC message 500 does not contain one or more dedicated PUCCH mapping parameters, the UE determines the PUCCH resource-to-RB mapping based on the serving cell's common parameters of $N^{(1)}_{PUCCH}$ and $N^{(2)}_{RB}$ as in 506.

In another embodiment of the present invention, a UE is configured with a dedicated ID, $n_{ID}$, that is used for generating both a base sequence index (BSI) and a cyclic shift hopping (CSH) sequence for all PUCCH formats. The UE initializes a pseudo-random sequence generator using either the PCID or $n_{ID}$. A binary flag is signaled to the UE to indicate whether the UE applies the PCID of the serving cell or applies the dedicated ID for generating the BSI and CSH sequence. The UE is further configured with dedicated UE-specific parameters $N^{(1)}_{PUCCH,UE}$ and $N^{(2)}_{RB,UE}$ to determine the starting offset of the dynamic PUCCH region.

Figure 6:
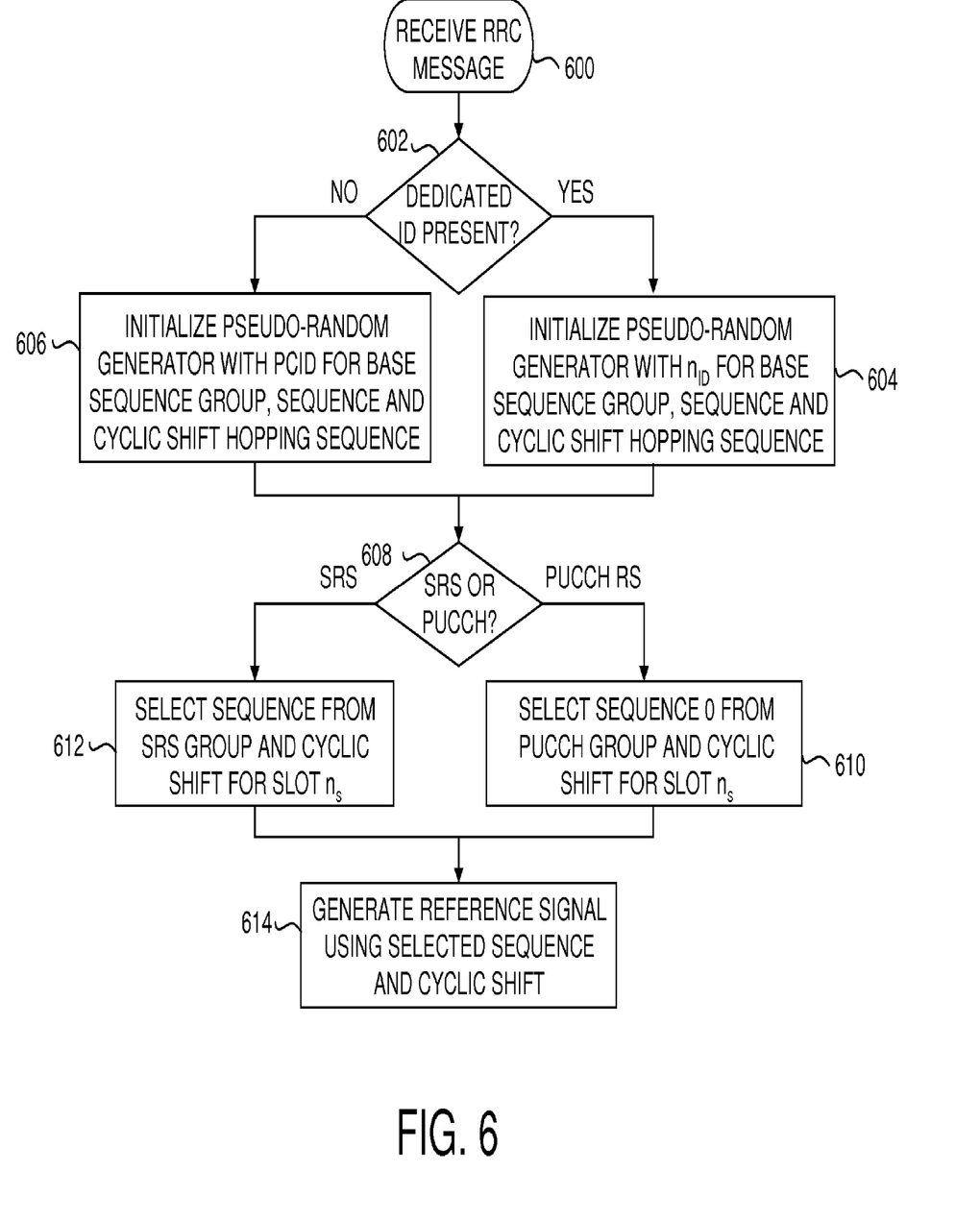
FIG. 6 is a flow diagram showing determination of PUCCH resource mapping to logical resource block based on cell-specific or UE-specific PUCCH parameters.

Now referring to FIG. 6 a flow diagram is shown to illustrate how a UE generates the reference signal for PUCCH or SRS transmission. The UE monitors for an RRC message 600. The UE determines in 602 if a detected RRC message contains a dedicated PUCCH or SRS ID, $n_{ID}$. If $n_{ID}$ is present, the UE initializes the pseudo-random number generators 604 for the base sequence group, sequence and cyclic shift hopping sequence with $n_{ID}$. Otherwise, if $n_{ID}$ is not detected in an RRC message the UE initializes the pseudo-random sequence generators for the base sequence group, sequence and cyclic shift hopping sequence with the PCID 606 of its serving cell. If block 608 determines that PUCCH is to be transmitted the UE selects in block 610 sequence 0 from the PUCCH sequence group and the cyclic shift corresponding to time slot $n_S$. Otherwise if block 608 determines that SRS is to be transmitted the UE selects in 612 the sequence group and cyclic shift corresponding to the time slot and corresponding SRS SC-FDMA symbol(s) within the time slot. At block 614, the UE generates the appropriate reference signal using the selected sequence.

CoMP enhancements can also be extended to SRS transmissions within a CoMP coordination area. For the shared PCID scenario, this enables an increase in SRS capacity but at the cost of increased inter-cell interference. Therefore, ensuring sufficient SRS capacity, while maintaining a reasonable SRS overhead per cell, becomes the primary concern as the number of served UEs increases within the CoMP coordination area. Area splitting gain can be achieved by configuring UEs clustered around a reception point with a virtual cell ID for SRS transmission to the desired reception point. As a consequence of introducing a VCID for SRS transmission the present invention also describes new mechanisms to improve SRS operation in a heterogeneous deployment. One case is where more UEs are transmitting to a macro eNB than to a pico eNB. Therefore, applying the same cell-specific SRS subframe configuration across macro and pico cells unfairly penalizes PUSCH transmission efficiency in the pico cell due to PUSCH rate matching in a cell-specific SRS subframe. A different but related issue occurs for decoupled data and control, wherein a UE receives PDCCH from one eNB but transmits PUSCH to a different eNB. Thus, if the SRS subframe configurations are different between the two cells, it needs to be determined which of these configurations should be adopted by the UE.

An embodiment of the present invention is the configuration of a dedicated UE-specific ID for SRS transmission. The UE determines the base sequence group and sequence hopping patterns from the signaled SRS ID.

Another embodiment of the present invention is that the UE is further configured with dedicated SRS parameters. For example, a macro UE can be configured with the cell-specific SRS parameters of a pico cell in order to transmit SRS to the pico eNB. The UE can be configured with dedicated parameters for the SRS subframe configuration, the SRS bandwidth configuration, and a parameter for enabling/disabling simultaneous SRS and HARQ-ACK transmission. For TDD systems a UE can further be configured with a parameter defining the maximum uplink pilot time slot (UpPTS) region.

Both open loop and closed loop UL power control are closely related to CoMP operation. This is because a wireless network may configure one set of transmission points for the DL of a UE and a different set of reception points for the UL of a UE. Referring back to FIG. 3, for example, UE 214 may be configured to send UL transmissions to pico eNB 206 to minimize interference. However, UE 214 may still be configured to receive DL transmissions from macro eNB 202. A problem of power control arises when the path loss between UE 214 and pico eNB 206 is significantly different from the path loss between UE 214 and macro eNB 202. The UE may be UL power controlled such that the reception at the pico eNB is below a desired threshold. However, the macro eNB 202 may still monitor UL transmissions from UE 214 for radio resource management functions or for use in the DL in TDD systems where channel reciprocity between UL and DL can be exploited. Therefore, a reduction in power to just satisfy a reception threshold at the pico eNB may degrade reception at the macro eNB. This problem typically arises whenever transmission points (TPs) and reception points (RPs) for a UE are not collocated. One solution to the problem is to provide separate power control loops for UL and DL. The first power control loop can be used for PUSCH, PUCCH and SRS transmissions to a nearby eNB. The second power control loop is used to ensure reliable reception at a second eNB with a larger path loss to the UE compared to the first eNB. This, however, creates other problems such as backwards compatibility with legacy systems. For example, a new mechanism is required for the eNB to signal independent transmit power control (TPC) commands to a UE. SRS power control for LTE Release 10 is given by equation [1].

$$P_{SRC,c}(i) = \min\{P_{CMAX,c}(i), P_{SRS\_OFFSET,c}(m) + 10 \log_{10}(M_{SRS,c}(i)) + P_{O\_PUSCH,c}(j) + \alpha_c(j) \cdot PL_c + f_c(i)\} \quad [1]$$

Here, $P_{CMAX,c}(i)$ is the configured maximum transmit power of subframe i for serving cell c. $P_{SRS\_OFFSET,c}(m)$ is a 4-bit parameter semi-statically configured by higher layers for m=0 and m=1 for serving cell c. Here, m is a trigger type to induce SRS transmission. $M_{SRS,c}(i)$ is the bandwidth of the SRS transmission in subframe i for serving cell c. The current power control adjustment state of subframe i for serving cell c is $f_c(i)$. $P_{O\_PUSCH,c}(i)$ and $\alpha_c(j)$ are PUSCH reference power spectral density and fractional power control parameters, respectively, for serving cell c. Here, j indicates the type of PUSCH transmission, namely in response to a semi-persistent, dynamic or random access response grant. $PL_c$ is the downlink path loss estimate calculated by the UE for serving cell c.

Another embodiment of the present invention resolves the foregoing power control problem and maintains backwards compatibility with minimal impact to the existing specification. According to this embodiment, the UE is configured by higher layer signaling to transmit aperiodic SRS with offset $P_{SRS\_OFFSET}(1)$ for UL transmission. The UE is configured by higher layer signaling to transmit aperiodic SRS with offset $P_{SRS\_OFFSET}(2)$ for DL transmission. The power control parameters are separately substituted for a single power control parameter and correspond to UL and DL power, respectively.

The present invention describes a method of signaling two or more power control commands to a UE. The UE can be configured for aperiodic SRS transmission using dedicated power control commands in a group power control signal that is transmitted on the PDCCH in a downlink control information (DCI) format. The UE can be configured by RRC signaling with the positions of two or more indexes in a bit map containing transmit power control commands to a multiplicity of UEs. One TPC index indicates a TPC command for a first power control loop and the other TPC index indicates a TPC command for a second power control loop. Each TPC index can indicate a 1- or 2-bit TPC command.

For example, in the LTE Release 10 system a 2-bit command is transmitted in DCI format 3 while a 1-bit command is transmitted in DCI format 3A. When the CRC of the DCI format is scrambled by a PUCCH RNTI, one TPC index can indicate the TPC command for the PUCCH whereas the other TPC index can indicate a TPC command for aperiodic SRS transmission. As a separate embodiment a set of one or more indexes can be used to indicate different SRS TPC commands to the UE. Other variations are not precluded, the main idea being that a UE is configured with multiple indexes in a group power control DCI to indicate TPC commands for different power control loops.

The prior art for CoMP operation mainly targets scenarios where inter-eNB signaling in a CoMP coordination area takes place over ideal backhaul links characterized by very high throughput and very low latencies on the order of less than 1-2 milliseconds. The embodiments of this present invention are also designed to work in deployments where latencies in inter-eNB signaling are on the order of at least tens of milliseconds. A base station may request over backhaul signaling (using e.g. the X2 signaling protocol) that neighboring base stations transmit their PUCCH configurations. Alternatively, a base station can signal, via the X2 logical interface, the PUCCH configuration of a cell under its control to one or more target cells controlled by other base stations. At a minimum the dynamic PUCCH offset parameter is indicated in the PUCCH information element signaled on the backhaul link. In addition the number of RBs allocated for transmitting CSI reports can be indicated to allow a neighboring eNB to accurately determine the HARQ-ACK region for a cell controlled by a different eNB. Other parameters may be optionally signaled including the number of PUCCH format 1/1a/1b resources that can be assigned in one RB, the number of cyclic shifts reserved for transmitting HARQ-ACK, and scheduling requests in a resource block used for mixed transmission of HARQ-ACK scheduling requests and CSI.

In a different embodiment of the present invention the PUCCH configuration or some of the elements of this configuration can be signaled by a first base station when requested by a second base station. In an alternate embodiment, a first base station may convey to a second base station a preferred PUCCH configuration for a neighboring cell under the control of the second base station.

For SRS transmission a first base station may indicate via e.g. the X2 interface the SRS subframe configuration and SRS bandwidth configuration of a cell under its control to a second base station that controls a neighboring cell. The second base station may take this information into account when configuring the neighboring cell's cell-specific SRS configuration and also the dedicated SRS configuration for a cell edge UE in that cell. For example, referring to FIG. 3 eNB 202 can configure macro cell A with a 5 ms periodicity for the cell-specific SRS subframes and a subframe offset of 0. Upon receiving this information, pico eNB 206 can configure the pico cell with the same 5 ms periodicity but with a different subframe offset to avoid inter-cell interference. In addition for TDD systems a parameter defining the maximum UpPTS region can be signaled over a backhaul link such as the X2 interface.

Figure 7:
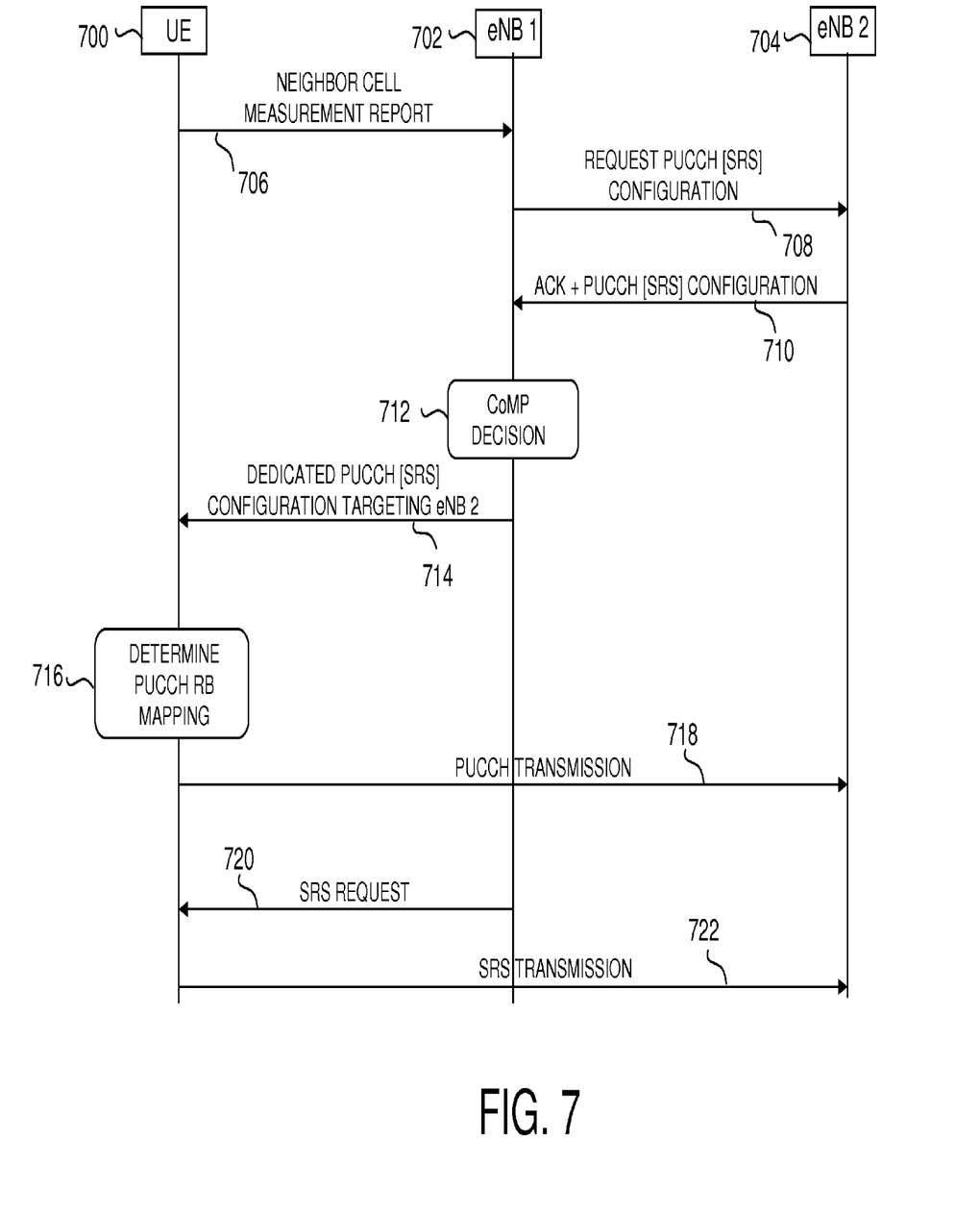
FIG. 7 is a flow diagram of inter-eNB signaling to determine a UE-specific configuration of PUCCH and SRS transmission parameters.

Referring now to FIG. 7, an exemplary flow chart is shown describing inter-eNB signaling to enable network operation in a heterogeneous network deployment. An eNB 702 controlling a cell serving UE 700 transmits a request for the cell-specific PUCCH and/or SRS configuration of a neighboring cell under the control of eNB 704. The request message 708 is transmitted over a backhaul link using the X2 signaling protocol. The eNB 704 sends a reply message 710 acknowledging the prior request and also transmits the requested PUCCH or SRS configuration over the backhaul link. The eNB 702 makes a decision 712 based on the received information from eNB 704 and on UE measurement report 706 on whether the UE should be configured to transmit PUCCH and/or SRS to eNB 704. If the decision is positive, eNB 702 transmits an RRC configuration message 714 to UE 700 with dedicated PUCCH or SRS parameters that match the PUCCH or SRS configuration of eNB 704. For PUCCH transmission UE 700 determines the RB mapping in 716 and transmits the required uplink control information on PUCCH 718. For an aperiodic SRS request 720 targeting eNB 704, the UE transmits the SRS 722 to eNB 704. Based on the UE measurement report 706 the eNB may alternatively determine in 712 that UE 700 should continue to use the cell-common PUCCH or SRS configuration. In this case blocks 716, 718, 720 and 722 are performed according to the cell-common configuration of eNB 702.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method for wireless communication comprising:
   receiving a signal from a base station;
   selecting a cell-specific parameter in response to a first state of the signal;
   selecting a user-specific parameter in response to a second state of the signal, wherein the user-specific parameter is a virtual cell identification parameter;
   initializing a first pseudo-random sequence generator for generating a base sequence with the virtual cell identification parameter;
   initializing a second pseudo-random sequence generator for generating a cyclic shift hopping sequence with the virtual cell identification parameter; and
   transmitting an uplink reference signal generated from the base sequence and the cyclic shift hopping sequence in response to the selected parameter.

2. The method of claim 1, wherein the cell-specific parameter is common to a cell served by the base station.

3. The method of claim 1, further comprising transmitting the uplink reference signal on a physical uplink control channel (PUCCH).

4. The method of claim 1, wherein the uplink reference signal is a sounding reference signal (SRS).

5. The method of claim 1, comprising:
   configuring a user equipment with dedicated user-specific uplink control resource allocation parameters for determining an uplink control region for transmitting channel state information reports; and
   determining an uplink control region for transmitting scheduling requests and Hybrid Auto Repeat Request (HARQ) acknowledgement reports.

6. The method of claim 1, further comprising determining a resource block for transmitting uplink control information on an uplink control channel.

7. The method of claim 6, wherein the uplink control information is one of a Hybrid Automatic Repeat Request acknowledgement (HARQ-ACK), a Channel State Information report, and a Scheduling Request.

8. The method of claim 7, wherein the HARQ-ACK is in response to one of a prior control signal scheduling downlink data transmission and a semi-persistently scheduled downlink data transmission.

9. The method of claim 1, further comprising configuring a user equipment with dedicated sounding reference signal (SRS) resource allocation parameters to determine time-frequency resources for transmitting a sounding reference signal.

10. The method of claim 9, wherein said SRS resource allocation parameters include one or more of SRS bandwidth configuration, SRS subframe configuration, an indication of whether simultaneous transmission of Hybrid Auto Repeat Request acknowledgement and SRS is permitted within a subframe, and a number of resources allocated for transmitting random access preambles.

11. A user equipment (UE) configured to:
receive a signal from a base station;
select a cell-specific parameter in response to a first state of the signal;
select a user-specific parameter in response to a second state of the signal, wherein the user-specific parameter is a virtual cell identification parameter;
initialize a first pseudo-random sequence generator for generating a base sequence with the virtual cell identification parameter;
initialize a second pseudo-random sequence generator for generating a cyclic shift hopping sequence with the virtual cell identification parameter; and
transmit an uplink reference signal generated from the base sequence and the cyclic shift hopping sequence in response to the selected parameter.

12. The UE of claim 11, wherein the cell-specific parameter is common to a cell served by the base station.

13. The UE of claim 11, wherein the UE is further configured to transmit the uplink reference signal on a physical uplink control channel (PUCCH).

14. The UE of claim 11, wherein the uplink reference signal is a sounding reference signal (SRS).

15. The UE of claim 11, wherein the UE is further configured to:
configure the UE with dedicated user-specific uplink control resource allocation parameters for determining an uplink control region for transmitting channel state information reports; and
determine an uplink control region for transmitting scheduling requests and Hybrid Auto Repeat Request (HARQ) acknowledgement reports.

16. The UE of claim 11, wherein the UE is further configured to determine a resource block for transmitting uplink control information on an uplink control channel.

17. The UE of claim 16, wherein the uplink control information is one of a Hybrid Automatic Repeat Request acknowledgement (HARQ-ACK), a Channel State Information report, and a Scheduling Request.

18. The UE of claim 17, wherein the HARQ-ACK is in response to one of a prior control signal scheduling downlink data transmission and a semi-persistently scheduled downlink data transmission.

19. The UE of claim 11, wherein the UE is further configured to configure the UE with dedicated sounding reference signal (SRS) resource allocation parameters to determine time-frequency resources for transmitting a sounding reference signal.

20. The UE of claim 19, wherein said SRS resource allocation parameters include one or more of SRS bandwidth configuration, SRS subframe configuration, an indication of whether simultaneous transmission of Hybrid Auto Repeat Request acknowledgement and SRS is permitted within a subframe, and a number of resources allocated for transmitting random access preambles.

21. A method for wireless communication, comprising:
receiving a signal from a base station;
determining if a physical uplink control channel (PUCCH) or sounding reference signal (SRS) ID, $n_{ID}$ is present in the signal;
initializing a pseudo-random number generator for a base sequence group, sequence and cyclic shift hopping sequence with $n_{ID}$ when $n_{ID}$ is present in the signal;
initializing a pseudo-random number generator for a base sequence group, sequence and cyclic shift hopping sequence with a Physical Cell Identification (PCID) associated with the base station when $n_{ID}$ is not present in the signal;
selecting a cell-specific parameter in response to a first state of the signal or a user-specific parameter in response to a second state of the signal; and
transmitting an uplink reference signal generated from the base sequence group, sequence and the cyclic shift hopping sequence in response to the selected parameter.

22. A user equipment (UE) configured to:
receive a signal from a base station;
determine if a physical uplink control channel (PUCCH) or sounding reference signal (SRS) ID, $n_{ID}$ is present in the signal;
initialize a pseudo-random number generator for a base sequence group, sequence and cyclic shift hopping sequence with $n_{ID}$ when $n_{ID}$ is present in the signal;
initialize a pseudo-random number generator for a base sequence group, sequence and cyclic shift hopping sequence with a Physical Cell Identification (PCID) associated with the base station when $n_{ID}$ is not present in the signal;
select a cell-specific parameter in response to a first state of the signal or a user-specific parameter in response to a second state of the signal; and
transmit an uplink reference signal generated from the base sequence group, sequence and the cyclic shift hopping sequence in response to the selected parameter.

* * * * *